J. EATON.
MOTOR CONTROL.
APPLICATION FILED DEC. 26, 1919.
1,434,689.
Patented Nov. 7, 1922.
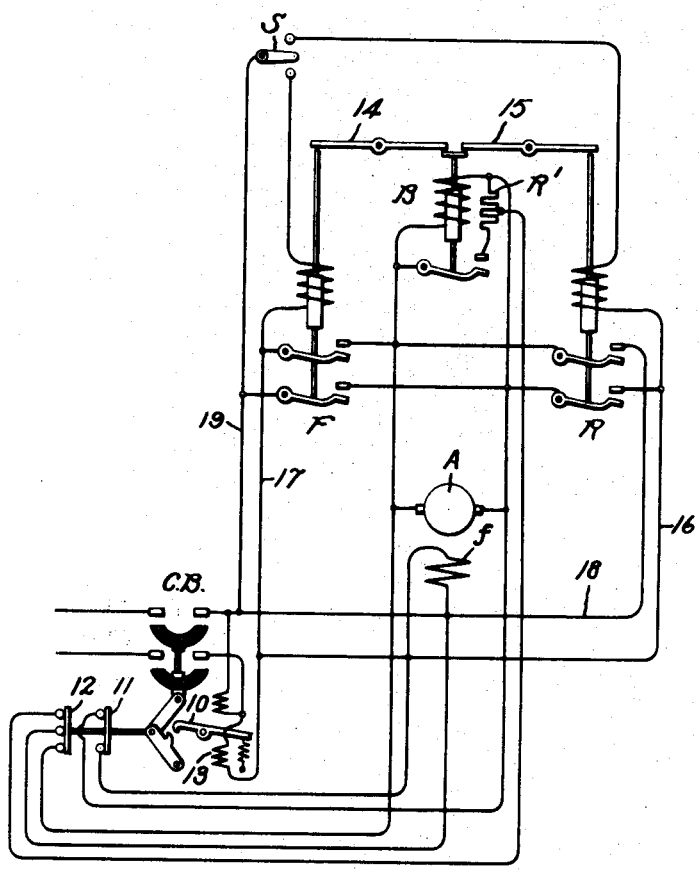
Inventor:
John Eaton,
by *Hubert G. Davis*
His Attorney.

Patented Nov. 7, 1922.

1,434,689

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

MOTOR CONTROL.

Application filed December 26, 1919. Serial No. 347,292.

*To all whom it may concern:*

Be it known that I, JOHN EATON, a subject of the King of Great Britain, residing at Schenectady, in the county of Schenectady, State of New York, have invented certain new and useful Improvements in Motor Controls, of which the following is a specification.

My invention relates to an improved motor control and it provides improved means whereby the motors are started and stopped and are generally controlled in a safe, reliable and efficient manner. More specifically, my invention relates to the control of the driving motor or motors for a machine having an element which is reciprocated by reversing the motor.

Although not limited to such use, my invention has a particular application in electric motor drives for planers or the like. Arrangements of this general nature have heretofore been provided in which an electromagnetic switch or contactor is provided for energizing the motor from the source of supply for each direction of operation, the forward and reverse contactors being interlocked in such a way that each contactor is prevented from closing unless the other has opened. In such an arrangement it occasionally happens that one of the contactors fails to open when its winding is de-energized so that the planer or other machine element will continue to operate in one direction and thereby cause serious damage. One of the objects of my invention is to prevent such an occurrence by instantaneously stopping the motor upon the failure of the contactor to open. In carrying out my invention in one form I so arrange the parts that, even though a contactor fails to open, the contactor for the reverse direction will nevertheless close thereby causing a dynamic braking circuit for the motor to be established to instantaneously stop the motor.

For a better understanding of my invention, reference is had to the accompanying drawing wherein I have shown my invention embodied in concrete form for purposes of illustration. In the single figure, which in simplified form, diagrammatically illustrates the embodiment of my invention, the electric motor having an armature A and shunt field $f$ is adapted to be energized from the source of supply for the forward direction through the contacts of the electromagnetic switch or contactor F and to be energized for the reverse direction through the contacts of the contactor R. The dynamic brake contactor B having its coil energized responsively to the motor armature voltage is adapted to close and include the braking resistance $R'$ in the motor armature circuit so as to bring the motor to rest quickly when either contactor is opened and before the other contactor is closed.

The windings of the contactors F and R are controlled by means of a master or pilot switch S, the arrangement being such that when the switch is thrown to the lower position the contactor F is energized to close, and when thrown to the upper position the contactor R is energized to close. A line switch or circuit breaker CB is provided for connecting the motor and its control equipment to the source of supply. This circuit breaker is adapted to be closed in any suitable manner and is adapted to be opened in response to either an overload by means of an overload coil which trips the pivoted latch 10, or in response to a failure of voltage, thereby permitting the circuit breaker to open in accordance with its bias to the open position. Interlocks 11 and 12 are provided on the circuit breaker for connecting the shunt field of the motor to the motor armature terminals and connecting the motor armature in a dynamic brake circuit with a portion of the resistance $R'$. The arrangement is such that when the current flowing through the series coil 13 is in excess of a predetermined value, or the voltage of the source of supply is less than a predetermined value, the circuit breaker will be automatically opened and the motor automatically connected in a dynamic brake circuit of low resistance so that the motor will be brought to rest very quickly.

A pivoted mechanical interlock 14 is provided for holding the brake contactor B open and preventing it from closing as long as the contactor F is closed, and a pivoted mechanical interlock 15 is provided for holding the brake contactor B open and preventing it from closing as long as the reverse contactor R is closed. There is no interlocking arrangement between the contactors F and R, so that it is possible for the one contactor to be closed even though the other contactor be maintained closed, as for instance in case the contact tips of this other contactor should be welded together and the contacts remain closed even through the contactor winding is deenergized.

As thus constructed and arranged, the operation of my invention is as follows: The circuit breaker CB will first be closed, and assuming that it is desired that the motor operate in the forward direction, the master switch S will be thrown to its lower position so as to energize the contactor F to close and connect the motor armature to the source of supply. The shunt field $f$ was connected to the source of supply by the closing of the circuit breaker. Assuming now that the motor has driven the planer or other machine in the forward direction and that it is desired that the machine be reversed, this will be accomplished by throwing the master switch S to its upper position, thereby energizing the winding of the contactor R. The brake contactor B will be energized to close during the interval between the deenergization of the winding of contactor F and the energization of the winding of contactor R, and the contactor B will close, connecting the motor armature in a dynamic brake circuit with the resistance R'. With the brake contactor closed, the reversing contactor cannot close until the motor has been very materially reduced in speed, since the pivoted mechanical interlock 15 will hold the contactor R open even though the winding of this contactor is energized. As soon as the speed of the motor has dropped to the predetermined value, the contactor R will close, thereby reversing the connection of the motor armature to the source of supply and energizing the motor for operation in the opposite direction. In reversing the motor from this direction to the forward direction, the brake contactor B will close to establish the dynamic brake circuit in the same manner as that explained in connection with the reversal from the forward direction to the return direction.

In case for any reason the contactor F should remain closed, due for instance to the welding together of its contacts, or for any other reason, and the winding of this contactor is deenergized by throwing the master switch from the lower to the upper position, the brake contactor will not be able to close since it is mechanically held open by the pivoted interlock 14. The machine driven by the motor will continue to be driven in the forward direction and a serious condition may result. However, in my arrangement, when the one contactor sticks, the other contactor which is provided for reversing the motor may be closed. Thus, when the master switch is thrown to the upper position, the winding of contactor R will be energized and this contactor will close, establishing a short circuit across the supply conductors, and including the motor in a dynamic braking circuit. The overload circuit breaker CB will thereupon automatically open its circuit and establish another dynamic braking circuit for the motor through the contact disc 12 and a portion of the resistance R', the field being connected to the motor armature through the contact disc 11. The motor will thereupon be brought to rest very quickly, and an accident to the machine driven by the motor thereby prevented. The same operation will occur in case the contactor R should stick when it is attempted to energize the motor for operation in the forward direction after an operation in the return direction. Thus, the forward contactor will be permitted to close, short circuiting the source of supply, including the motor in a dynamic brake circuit and automatically opening the overload circuit breaker, including the motor in an additional dynamic brake circuit.

It will be observed that a dynamic brake circuit is established when both contactors close, independently of that established by the circuit breaker CB in its open position. Thus, in case the forward contactor should remain closed and the reversing contactor closed, the motor armature is connected in a local dynamic brake circuit of low resistance, the dynamic brake circuit including both contacts of each switch. Thus, one dynamic brake circuit is through the lower contact of switch R, the conductor 16, conductor 17, and upper contact of switch F. Another dynamic brake circuit is also closed, which includes the upper contact of switch R, conductor 18, conductor 19, and the lower contact of switch F. The motor field will in this case be connected across the motor armature, and although the field is short circuited through the contacts of contactors F and R, this field will continue to be energized for an interval sufficient to bring the motor to rest because of the inductance of the field. The inductance of the forward and reversing contactor electromagnets will also cause the last contactor to be closed to be maintained closed for an interval. However, it is possible that when the contacts of one contactor stick and the other contactor is closed, thus establishing a short circuit, the contacts of the last contactor to close will be welded shut. This is preferable to having the motor operate the driven machine beyond the predetermined limits. The circuit breaker CB is not necessary for the operation of my invention and an ordinary overload circuit breaker or fuse or other means may be provided for disconnecting the motor from the source of supply when the source of supply is short circuited by the closing of both contactors.

What I claim as new and desire to secure by Letters Patent of the United States, is:

1. The combination in a system of motor control of means for connecting the motor to a source of supply for opposite directions of rotation comprising an electromagnetic switch for each direction and a reversing switch for controlling the same, a brake for the motor adapted to be applied during the interval between the opening of one switch and the closing of the other, means for preventing the application of the brake in case either switch is closed, and means whereby upon the failure of one of said electromagnetic switches to open upon the energization of the other by the reversing switch, a dynamic braking circuit for the motor is established.

2. The combination in a system of motor control, of a pair of switches, one for connecting the motor to a source of supply for operation in one direction and the other for connecting the motor to the source for operation in the reverse direction, means for automatically establishing a dynamic brake circuit upon the opening of either electromagnetic switch and for preventing the closing of the said brake circuit unless both switches are open, and means whereby closing the one switch with the other switch closed establishes a dynamic braking circuit for the motor for bringing the motor quickly to rest.

3. The combination in a system of motor control of a pair of switches, one for connecting the motor to a source of supply for operation in one direction and the other for connecting the motor to the source for operation in the reverse direction, a dynamic brake circuit, means for automatically establishing the same during the interval between the opening of either switch and the closing of the other, means for preventing the establishment of said brake circuit in the case either switch is closed, and connections whereby the closing of one switch with the other switch closed establishes another dynamic braking circuit for the motor through the contacts of both switches.

4. The combination in a system of motor control, of a pair of electromagnetic switches, one for connecting the motor to a source of supply for operation in one direction and the other for connecting the motor to the source for operation in the other direction, a normally open dynamic brake circuit and means for automatically closing the same during the interval between the opening of one switch and the closing of the other switch, means for preventing the closing of the brake circuit when either switch is closed, a master switch for controlling the windings of said switches, the said master switch having two operative positions at each of which the winding of one switch is energized and the winding of the other switch is deenergized, and connections whereby closing one electromagnetic switch includes the motor in a dynamic brake circuit provided the other switch does not open.

5. The combination in a system of motor control, of a pair of electromagnetic switches, one for connecting the motor to a source of supply for operation in one direction and the other for connecting the motor to the source for operation in the other direction, a master switch for controlling the windings of said switches, the said master switch having two operative positions at each of which the winding of one switch is energized and the winding of the other switch is deenergized, a circuit breaker having means for automatically opening the same and including the motor in a dynamic brake circuit, and connections whereby closing one electromagnetic switch provided the other electromagnetic switch does not open includes the motor in a dynamic brake circuit through the contacts of both electromagnetic switches, and causes the circuit breaker to automatically open and establish another dynamic brake circuit.

In witness whereof, I have hereunto set my hand this 23rd day of December, 1919.

JOHN EATON.